United States Patent

[11] 3,622,665

[72] Inventors Alexander D. Argoudelis
Portage;
Joseph E. Grady, Kalamazoo, both of Mich.
[21] Appl. No. 838,645
[22] Filed July 2, 1969
Continuation-in-part of Ser. No. 687,488,
Dec. 4, 1967, which is a continuation-in-part of application Ser. No. 427,957, Jan. 25, 1965, now abandoned. This application July 2, 1969, Ser. No. 838,645
[45] Patented Nov. 23, 1971
[73] Assignee The Upjohn Company
Kalamazoo, Mich.

[54] PROCESS FOR TREATING GRAM-NEGATIVE BACTERIAL DISEASES WITH PENTAKIS [N-SULFOMETHYL] CIRCULIN OR SALT THEREOF
6 Claims, No Drawings

[52] U.S. Cl. .................................................. 424/177
[51] Int. Cl. ................................................. A61k 27/00
[50] Field of Search ........................................... 260/112.5;
424/177

[56] References Cited
UNITED STATES PATENTS
2,779,705  11/1957  Peterson et al. ............. 260/112.5
3,044,934  7/1962   Wilkinson ..................... 424/116
3,061,515  10/1962  Fardig .......................... 424/119
3,205,137  5/1965   Lewis et al. .................. 424/117
3,317,506  5/1967   Wilkinson ..................... 260/112.5

OTHER REFERENCES
Grady et al., Fed. Proc. 17, 233 (1958)
Hayashi et al., Bull. Inst. Chem. Res. (Kyoto) 43, 273– 274 (1965)
Logemann et al., Arzneimmittelforschung 5, 213– 220 (1955)
Suzuki et al., J. Bio Chem. 54, 412– 418 (1963)

Primary Examiner—Jerome D. Goldberg
Attorneys—Eugene O. Retter and Joseph K. Andonian ABSTRACT: Pentakis[N-(sulfomethyl)]circulin and its pharmacologically acceptable cationic salts consisting of sodium, potassium, lithium, ammonium, triethylamine, N-ethylpyridine and procaine, prepared in unit dosage form in combination with a pharmaceutical carrier for systemic, local and topical administration to animals animals and mammals, including avian species for treatment of diseases caused by gram-negative organisms.

PROCESS FOR TREATING GRAM-NEGATIVE BACTERIAL DISEASES WITH PENTAKIS [N-SULFOMETHYL] CIRCULIN OR SALT THEREOF

CROSS-REFERENCE TO RELATED APPLICATION

This application is a continuation-in-part of application Ser. No. 687,488 filed Dec. 4, 1967, now allowed, which in turn is a continuation-in-part of application Ser. No. 427,957 filed Jan. 25, 1965, now abandoned.

BRIEF SUMMARY OF THE INVENTION

This invention relates to a process for treating diseases in animals and more particularly to the treatment of animals and mammals, including avian species, infected with a disease-producing gram-negative organism by systemic, local or topical administration of pentakis[N-(sulfomethyl)]circulin or a pharmacologically acceptable salt thereof.

DETAILED DESCRIPTION

Pentakis[N-(sulfomethyl)]circulin and its pharmacologically acceptable salts, e.g. sodium, potassium, lithium, ammonium, choline, triethylamine, N-ethylpyridine, and procaine can be prepared by methods disclosed in application Ser. No. 687,488, filed Dec. 4, 1967, now allowed.

Pentakis[N-(sulfomethyl)]circulin and its pharmacologically acceptable salts, show less toxicity in mammals than does circulin per se, without a change in antibacterial spectrum. Thus, pentakis[N-(sulfomethyl)]circulin and its pharmacologically acceptable salts have a better "therapeutic index" than circulin. (The relationship between the desired and undesired effects of a drug is termed its "therapeutic index" — see "The Pharmacological Basis of Therapeutics," Third Edition, by L. S. Goodman and A. Gillman, on page 22). Unexpectedly, the compound of this invention also is more active than polymyxin methanesulfonate (colistin methanesulfonate) against Escherichia coli and Pseudomonas aeruginosa infections in mice. This difference in activity between the methanesulfonates of polymyxin and circulin is unexpected because polymyxin per se and circulin per se have about the same activity against these bacteria in mice. There is nothing in the antibiotic art which teaches or even suggests that the antibacterial activities would become different when the methanesulfonate derivatives of circulin and polymyxin are produced.

The prior art discloses methanesulfonates of polypeptide antibiotics other than circulin. These methanesulfonates are disclosed as being made to reduce toxicity problems associated with use of the parent antibiotic. For example, Wilkinson U.S. Pat. No. 3,044,934 discloses that the methanesulfonate of polymyxin reduces undesirable local effects of polymyxin. Lewis et al. U.S. Pat. No. 3,205,137 discloses that the methanesulfonate of bacitracin overcomes the toxicity of bacitracin to the kidneys.

The antibacterial properties of polymyxin sulfate, polymyxin methanesulfonate, circulin sulfate and circulin methanesulfonate were determined against the Gram-negative micro-organisms Escherichia coli and Pseudomonas aeruginosa in mice infected with these bacteria. The conditions of the tests and results are as follows:

Groups of 10 CF-1 male albino mice weighing 18-20 gms. were infected intraperitoneally with approximately 100 lethal doses of a standardized frozen suspension of either Escherichia coli or Pseudomonas aeruginosa. Four groups of 10 infected mice each were treated immediately and once per day for the next three days (total of four doses) via the subcutaneous route with 2 X increment dilutions of circulin sulfate, circulin methanesulfonate, colistin sulfate, or colistin methanesulfonate. All antibiotic preparations were dissolved in 0.05 M, phosphate buffer, pH 7.0. Deaths of the treated and non-treated control animals were recorded for 7 days and the median protective dose of each compound was calculated by the Spearman-Karber ("Statistical Methods in Biological Assays." 2nd. Ed. Hafner Publishing Co., N.Y., N.Y., 1964, at pp. 524-530) method programmed for an IBM 360 digital computer. The results are summarized in the following table:

Median Protective Dose[1]

| Compound | E. coli (mg./kg.) | P. aeruginosa (mg./kg.) |
|---|---|---|
| Circulin | 0.87 (0.69–1.1) | 23 (16–32) |
| Colistin sulfate | 1.2 (1.0–1.5) | 21 (15–31) |
| Circulin methanesulfonate | 1.0 (0.67–1.4) | 92 (61–138) |
| Colistin methanesulfonate | 10.0 (7.2–15) | 211 (141–305) |

[1] Calculated on a weight basis.

Note:

a. The results for the compounds circulin methanesulfonate and colistin methanesulfonate against E. coli infections, differ from each other by a statistically significant amount ($p=0.05$).

b. The results for the compounds circulin methanesulfonate and colistin methanesulfonate against P. aeruginosa infections, differ from each other by a statistically significant amount ($p=0.05b$).

Similarly various disease entities in animals which are caused by the following gram-negative bacteria can be treated.

Pseudomonas aeruginosa—wound infections, bovine mastitis, external ear infections in dogs and cats, equine abortions, worming infections of dogs and cats. Enteritis of calves.

Vibrio fetus —vibrionic abortion of sheep and cows.

Vibrio jejuni—acute enteritis in cattle and calves.

Vibrio methchnikovii—acute enteritis in chickens.

Vibrio coli—swine dysentery.

Vibrio spp.—avian hepatitis.

Escherichia coli—colibacillosis of pigs, calves, lambs, and foals; pyelonephritis, navel infections, joint infections, cervicitis, mastitis and metritis; chronic respiratory disease of chickens.

Klebsiella genitalium—cervicitis, metritis in the mare.

Arizona paracolon—enteritis, septicemia in turkeys, chickens and calves.

Proteus spp.—Turkeys, chickens, pigeons, ducks, game birds, canines, horses, cows, sheep, pigs, dogs, foxes, rats, mice, guinea pigs.

(Include S. typhimurium, abortivoequina, chloeraesuis, derby, dublin, heidelburg, newport, etc.)

S. choleraesuis—acute infectious enteritis of swine.

S. pullorum—severe enteritis and bacteremia of chickens.

S. gallinarum—acute enteritis and septicemia of chickens.

Shigella equirulis—arthritis, glomerulonephritis, and septicemia of foals.

Brucella abortus—contagious abortion of cattle, fistulous withers and "poll evil" in horses. Abortion in swine, goats.

Brucella canis—abortion in dogs.

Bordetella bronchiseptica—canine pneumonia and tracheobronchitis.

Pasteurella multocida—fowl cholera of chickens, turkeys and other fowl, hemorrhagic septicemia or shipping fever of cattle and sheep, secondary to VPP pneumonia in pigs, "snuffles" in rabbits, pasteurellosis in mink.

Pasteurella hemolytica—pneumonia of cattle and sheep.

Hemophilus suis—swine influenza.

Hemophilus canis—male genital infections of dogs.

Hemophilus gallinarum—infectious coryza of poultry.

Hemophilus ovis—respiratory infections of sheep.

Moraxella bovis—bovine infectious keratoconjunctivitis (pink-eye).

Actinobacillus lignieresi—"Wooden-tongue" in cattle, cervical abscesses in sheep and cattle, mammary abscesses in sow.

Spherophorus necrophorus—necrotic and gangrenous lesions in a variety of animals; infectious pododermatitis and mastitis in cattle; calf diphtheria; enteritis and "bull-nose" of swine.

The active compound of the invention, pentakis[N-(sulfomethyl)]-circulin and the pharmacologically acceptable salts are administered for systemic treatment in the form of parenteral compositions.

For parenteral administration, fluid unit dosage forms are prepared utilizing the antibiotic and a sterile vehicle, water being preferred. The active compound, depending on the form and concentration used, can be either suspended or dissolved in the vehicle. In preparing solutions the water-soluble forms can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the solution prior to use. Parenteral suspensions are prepared in substantially the same manner except that the active compound is suspended in the vehicle instead of being dissolved and sterilization cannot be accomplished by filtration. The active compound can be sterilized by exposure to ethylene oxide before suspending in the sterile vehicle. Advantageously, a surfactant or wetting agent is included in the composition to facilitate uniform distribution of the antibiotic.

The active compounds of the present invention are also useful for topical or local application, i.e., to the eye, ear, nose, throat, skin, vaginal and rectal areas. For such application, drops, washes, sprays, lozenges, troches, and suppositories are preferred.

Topical ointments can be prepared by dispersing the antibiotic in a suitable ointment base such as petrolatum, lanolin, polyethylene glycols, mixtures thereof, and the like. Advantageously, the antibiotic is finely divided prior to dispersing in the ointment base. Topical creams and lotions are prepared by dispersing the antibiotic in the oil phase prior the emulsification of the oil phase in water.

The parenteral dosage for systemic treatment is from about 1 to about 100 mg./kg. of body weight of the subject administered depending upon the species, and severity of the disease. Conveniently, the dosage unit form will contain from about 25 mg. to 500 mg. per dosage unit.

Composition for topical application, e.g. sprays, lotions, drops, ointments, suppositories, are prepared having a concentration from about 0.1 to about 5 percent w/w of the carrier.

In addition to pentakis[N-(sulfomethyl)]circulin as the principal active ingredient of compositions for the treatment of the conditions described herein, the said pentakis[N-(sulfomethyl)]circulin can be included with other coative materials to obtain advantageous combinations of properties. Such combinations include pentakis[N-(sulfomethyl)]circulin with other antibacterial agents such as spectinomycin, chloramphenicol, lincomycin, clindamycin, tetracyclines, e.g. tetracycline, oxytetracycline and chlortetracycline, penicillins, erythromycin, novobiocin, neomycin, bacitracin, nystatin, sulfas, e.g. sulfadiazine, sulfamerazine, sulfamethazine, sulfacetamide, sulfaethidole, sulfamethizole and phthalylsulfathiazole to broaden the bacterial spectrum of the composition and for synergistic action against particular bacteria.

The following examples are illustrative of the best mode contemplated by the inventors for carrying out their invention and are not to be construed as limiting.

EXAMPLE 1

A sterile aqueous solution containing 300 mg. of pentakis[N-(sulfomethyl)]circulin sodium in each 2 ml. is prepared from the following ingredients:

| | |
|---|---|
| Pentakis[N-(sulfomethyl)] circulin sodium | 300 g. |
| Benzyl alcohol | 20 ml. |
| Water for injection q.s. | 2,000 ml. |

The antibiotic and benzyl alcohol are dissolved in the water for injection and the resulting solution sterilized by passing through a sterilizing filter. One thousand 2 ml. vials are filled and sealed. This composition is useful in a 2 ml. dose intramuscularly for the treatment of a medium size dog suffering from a urinary tract infection caused by *Pseudomonas aeruginosa*.

EXAMPLE 2

As in example 1 above a sterile aqueous solution containing 10 mg. of pentakis[N-(sulfomethyl)]circulin sodium in each ml. is prepared by substituting 20 g. of antibiotic for the 300 g. This preparation is used subcutaneously at a dose of 0.5 to 1 ml. (depending on the age) in chickens and turkeys in the treatment of diseases caused by *E. Coli* such as colibacillosis and complicated chronic respiratory disease.

EXAMPLE 3

One thousand grams of an ointment for the treatment of mastitis in dairy cattle is prepared from the following ingredients:

| | |
|---|---|
| Pentakis[N-(sulfomethyl)] circulin sodium | 25 g. |
| Spectinomycin sulfate | 25 g. |
| Methylprednisolone acetate | 0.5 g. |
| Light liquid petrolatum | 300 g. |
| Chlorbutanol, anhydrous | 5 g. |
| Polysorbate 80 | 5 g. |
| 2% Aluminum monostearate-peanut oil gel | 400 g. |
| White petrolatum q.s. | 1000 g. |

The pentakis[N-(sulfomethyl)]circulin sodium, spectinomycin sulfate and methylprednisolone acetate are milled with the light liquid petrolatum until finally divided and uniformly dispersed. The chlorbutanol, polysorbate 80, peanut oil gel and white petrolatum are heated to 120° F. to form a uniform melt and the liquid petrolatum dispersion stirred in. With continued stirring, the dispersion is allowed to cool (and congeal) to room temperature and is filled into disposable mastitis syringes in 10 g. doses.

EXAMPLE 4

One thousand grams of an ophthalmic ointment containing 0.5 percent of pentakis[N-(sulfomethyl)]circulin sodium is prepared from the following ingredients:

| | |
|---|---|
| Pentakis[N-(sulfomethyl)] circulin sodium | 5 g. |
| Bacitracin | 12.2 g. |
| Light liquid petrolatum | 250 g. |
| Wool fat | 200 g. |
| White petrolatum q.s. | 1,000 g. |

The foregoing ointment is usefully applied to the eye for the treatment of a localized mixed infection in animals.

Advantageously the foregoing composition can contain 5 g. (0.5 percent) of methylprednisolone for the treatment of inflammation.

EXAMPLE 5

A sterile aqueous solution for intramuscular use, containing in 2 ml. 500 mg. of pentakis[N-(sulfomethyl)]circulin sodium is prepared from the following ingredients:

| | |
|---|---|
| Pentakis[N-(sulfomethyl)] circulin sodium | 250 g. |
| Methylparaben | 2.5 g. |
| Propylparaben | 0.17 g. |
| Water for injection q.s. | 1,000 ml. |

The ingredients are dissolved in the water and the solution sterilized by filtration. The sterile solution is filled into vials and the vials sealed. This composition is useful in a 2 ml. dose given intramuscularly for the treatment of cattle and swine suffering from pneumonias caused by gram-negative organisms, especially *Pasteurella hemolytica*.

We claim:

1. A process for treating an animal infected with Gram-negative bacteria which comprises administering to said animal, an anti-Gram-negative bacteria effective dose of a compound selected from the group consisting of pentakis-[N-(sulfomethyl)]circulin and its pharmacologically acceptable cationic salts consisting of sodium, potassium, lithium, ammonium, triethylamine, N-ethylpyridine, and procaine.

2. A process according to claim 1 wherein the animal is laboratory mice infected with *Pseudomonas aeruginosa* bacteria.

3. A process according to claim 1 wherein the animal is laboratory mice infected with *Escherichia coli* bacteria.

4. A process according to claim 1 wherein the dose of the compound selected is from about 1 to about 100 mg./kg. body weight of the animal.

5. A process for treating a mammal infected with Gram-negative bacteria which comprises administering to said mammal, an anti-Gram-negative bacteria effective dose of a compound selected from the group consisting of pentakis[N-(sulfomethyl)]circulin and its pharmacologically acceptable cationic salts consisting of sodium, potassium, lithium, ammonium, triethylamine, N-ethylpyridine, and procaine.

6. A process according to claim 5 wherein the dose of the compound selected is from about 1 to about 100 mg./kg. body weight of the mammal.

* * * * *